Nov. 18, 1952     J. L. SKAGGS     2,618,052
MOTOR PULLER
Filed Sept. 15, 1950
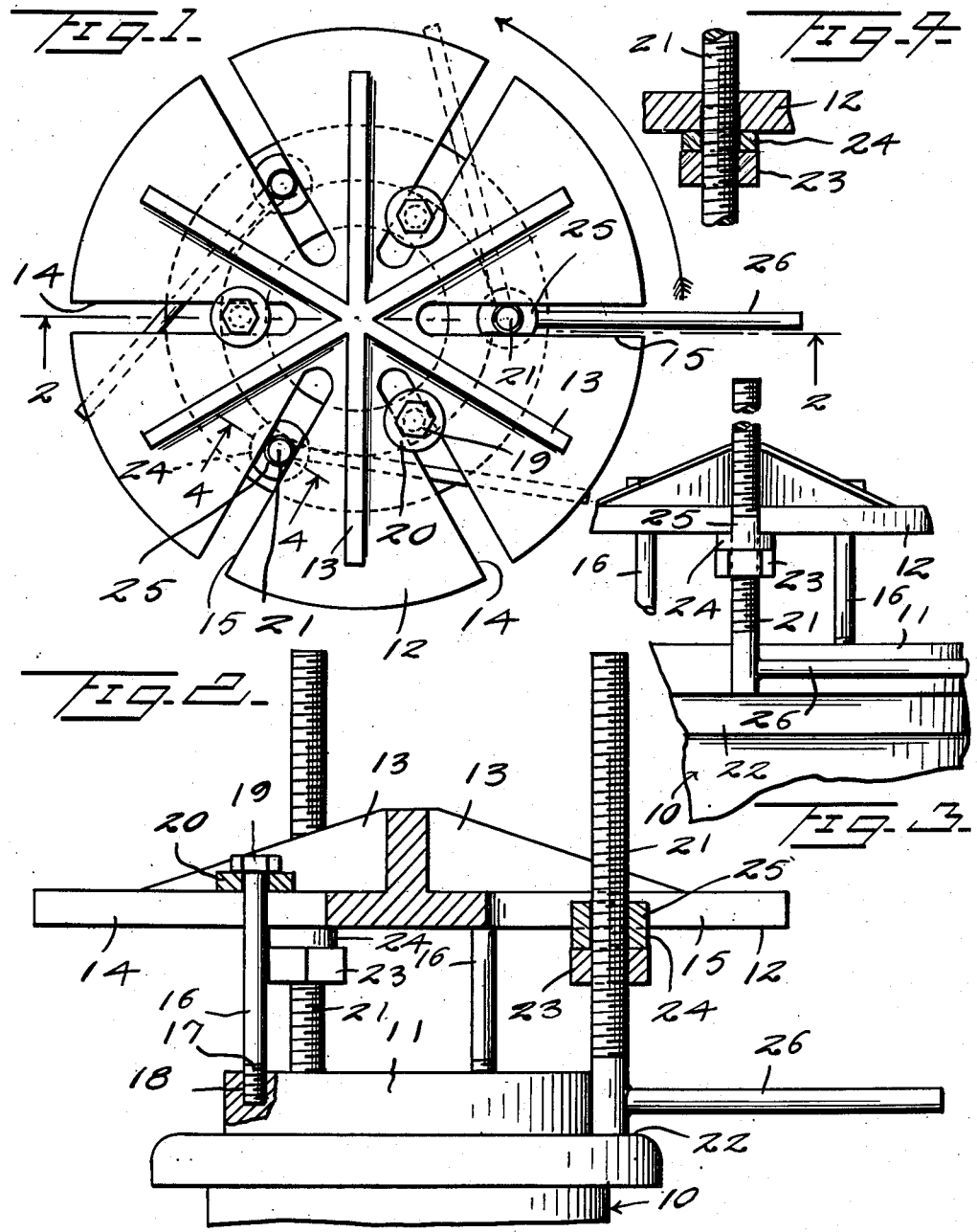
INVENTOR
J. L. Skaggs
BY
Kimmel & Crowell ATTORNEYS Patented Nov. 18, 1952

2,618,052

UNITED STATES PATENT OFFICE 2,618,052

MOTOR PULLER

John L. Skaggs, Phoenix, Ariz.

Application September 15, 1950, Serial No. 185,100

1 Claim. (Cl. 29—256)

This invention relates to a puller for motors which are mounted in sealed units.

In a number of electric refrigerators the motor is mounted in a sealed unit and for each make or type of refrigerator the manufacturer provides a puller for the unit. Inasmuch as the types of sealed units vary with each manufacturer, a repair shop must have on hand a separate puller for each type as the puller of one manufacturer cannot be satisfactorily used with other types.

It is, therefore, an object of this invention to provide a motor puller which is so constructed and arranged that it can be easily and quickly adapted to pull any type of motor.

Another object of this invention is to provide a motor puller which will not injure either the motor or housing.

With the above and other objects in view, my invention consists in the arrangement, combination and details of construction disclosed in the drawings and specification, and then more particularly pointed out in the appended claim.

In the drawings:

Figure 1 is a top plan view of a motor puller constructed according to an embodiment of this invention.

Figure 2 is a sectional view taken on the line 2—2 of Figure 1.

Figure 3 is a fragmentary side elevation of the device.

Figure 4 is a fragmentary sectional view taken on the line 4—4 of Figure 1.

Figure 5 is a detail side elevation of a modified form of puller bolt.

Figure 6 is a detail side elevation of another modified form of puller bolt.

Referring to the drawings, the numeral 10 designates generally a housing within which a motor 11 is pressed and firmly secured. In order to provide a means whereby the motor 11 may be withdrawn from the housing 10 which forms a part of a sealed motor unit, I have provided a puller structure which includes a disc-shaped plate 12 provided with a plurality of radially disposed bracing webs 13. The plate 12 is provided with one series of radially disposed slots 14 which open through the marginal edges thereof and is also provided with a second series of radially disposed slots or openings 15.

The slots or openings 14 and 15 are disposed between the webs 13. A bolt 16 is extended through a slot 14 being threaded at its lower end as indicated at 17 into the adjacent end of the motor 11. The motor 11 is formed with a series of threaded openings 18 in the outer end thereof so that the motor may be removed from the housing 10 by means of a pulling device.

The head 19 of each bolt 16 is disposed on the upper side of the plate 12 and a washer 20 is interposed between the head 19 and the upper side of the plate. A plurality of pressure bolts 21 are extended through the slots 15 and as shown in Figure 2 the lower ends of the bolts 21 are adapted to engage on a rim 22 which forms a part of the housing 10.

A nut 23 is threaded on each bolt 21 below the plate 12, and a washer 24 is interposed between the nut 23 and the lower side of the plate 12. Each washer 24 is provided with a pair of upwardly extending lugs 25 loosely engaging in the slots 15 so that the washers 24 will be held against rotation. Each bolt 21 also has fixed thereto a right angularly disposed bar 26 which extends right angularly from the lower end of the bolt and is adapted to engage the projecting portion of the motor 11 or a projecting portion of the housing 10 above the rim or flange 22.

The bar 26 provides a means whereby the bolt 21 will be held against rotation at the time the nut 23 is turned to unthread the nut 23 relative to the bolt 21 and thereby force the plate 12 upwardly.

In Figure 5 there is disclosed a modified form of puller bolt 16a having a threaded shank 27 with a hook 28 at the lower end thereof which is adapted to hook through an opening in a motor, and in Figure 6 there is disclosed another modified form of puller bolt 16b having a threaded shank 29 and a laterally projecting lug 30. These modified forms of puller bolts are used where the motor is not provided with threaded holes.

In the use and operation of this device the bolts 16 are extended through the slots 14 and threaded into the openings 18 in the adjacent outer end of the motor 11. The pressure bolts 21 are extended through the slots 15 with the lower ends thereof engaging on the rim or flange 22 and with the nuts 23 positioned below the plate 12. The nuts 23 may thereupon be turned to unthread the nuts from the bolts 21 so that the plate 12 will be moved upwardly or endwise with respect to the housing 10. As the plate 12 moves upwardly or endwise relative to the housing 10 the bolts 16 which are secured to the motor 11 will pull the motor therewith.

Where a motor is not provided with threaded openings such as openings 18, bolts 16a or 16b are used. It will be understood that each manufacturer has a special type of motor and special openings to receive the pulling devices, and for this reason special pulling bolts are required. A motor puller constructed according to this invention due to its construction and arrangement can be easily and quickly adapted to pull any type of sealed unit motor, and will not injure either the motor or motor housing.

What is claimed is:

A puller for pulling a motor from a flanged housing having apertures in the end thereof into which the motor is pressed, said puller comprising a plate formed with a plurality of radially disposed open ended slots, a plurality of headed bolts extending through certain ones of said slots and engaged in said apertures in said end of the motor, a plurality of pressure bolts extending through certain others of said slots, one end of each of said pressure bolts bearing against the flange of said housing, nuts threaded on said pressure bolts below said plate, a washer on each pressure bolt between said nut and plate, lugs carried by each washer projecting into a slot for holding said washer against turning, and a laterally projecting bar fixed to and extending from the lower portion of each pressure bolt for engagement with a part of the motor or housing to hold said pressure bolts against turning when said nuts are turned to move said plate and hence displace said motor.

JOHN L. SKAGGS.

REFERENCES CITED

The following references are of record in the file of this patent:

UNITED STATES PATENTS

| Number | Name | Date |
|---|---|---|
| 573,323 | Drysdale | Dec. 15, 1896 |
| 577,953 | Hanna | Mar. 2, 1897 |
| 1,443,052 | Stephens | Jan. 23, 1923 |
| 1,865,420 | Kirk | June 28, 1932 |

FOREIGN PATENTS

| Number | Country | Date |
|---|---|---|
| 223,732 | Great Britain | Oct. 30, 1924 |